United States Patent [19]

Hold et al.

[11] Patent Number: 4,491,417
[45] Date of Patent: Jan. 1, 1985

[54] DEVOLATILIZING MIXING EXTRUDER

[75] Inventors: Peter Hold, Milford; Marc A. Rizzi, Orange, both of Conn.

[73] Assignee: USM Corporation, Farmington, Conn.

[21] Appl. No.: 487,447

[22] Filed: Apr. 29, 1983

[51] Int. Cl.³ .............................................. B29B 1/06
[52] U.S. Cl. ........................................ 366/75; 159/2.2; 366/90; 366/305; 366/307; 425/203; 425/812
[58] Field of Search ....................... 366/75, 79, 80, 90, 366/99, 305, 307, 318, 322; 159/2 E; 425/203, 207, 208, 209, 812; 264/102

[56] References Cited

U.S. PATENT DOCUMENTS

| | | | |
|---|---|---|---|
| 2,488,189 | 11/1949 | Hanson | 425/203 X |
| 2,693,348 | 11/1954 | Ellermann | |
| 2,744,287 | 5/1956 | Parshall et al. | 425/208 |
| 3,031,030 | 4/1962 | Rodenacker | 366/75 X |
| 3,475,787 | 11/1969 | Heston | |
| 3,790,328 | 2/1974 | Maxwell | |
| 3,863,905 | 2/1975 | Maxwell | |
| 3,992,500 | 11/1976 | Kruder et al. | 366/75 X |
| 4,411,532 | 10/1983 | Valsamis et al. | 366/99 |

Primary Examiner—Philip R. Coe
Attorney, Agent, or Firm—Vincent A. White

[57] ABSTRACT

An extruder including a devolatilizing section having helical channels formed in the barrel and having a cylindrical rotor closing the inner sides of the channels. Material is fed onto the rotor surface which rotates and forms the material into one or more rolling banks engaging only the upstream flank of the channels and the rotor surface. Helical vent slots pass through the barrel into each channel at the downstream flanks not occupied by the rolling bank.

14 Claims, 12 Drawing Figures

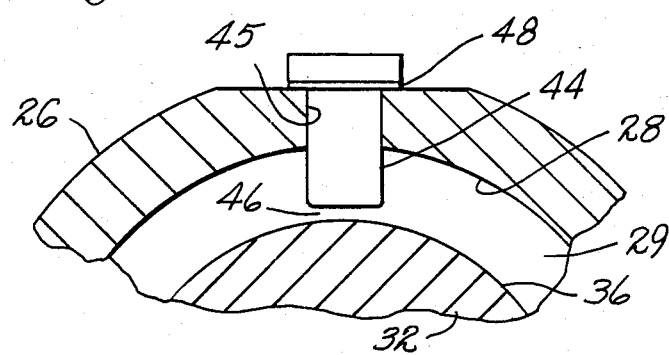
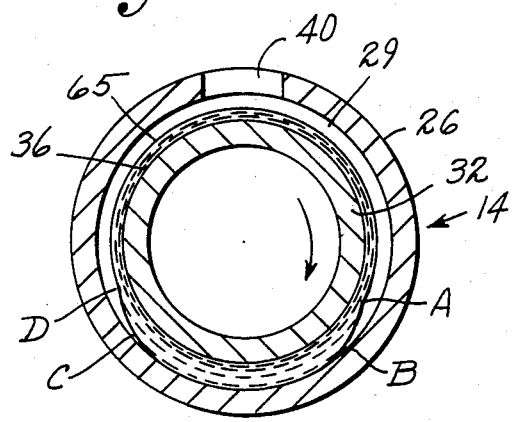
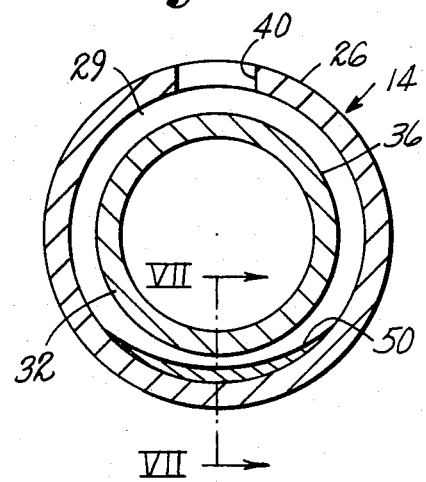
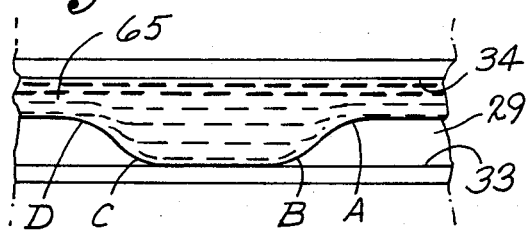
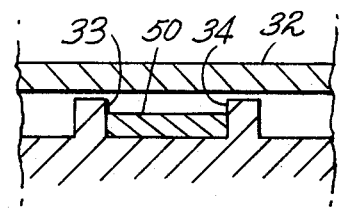

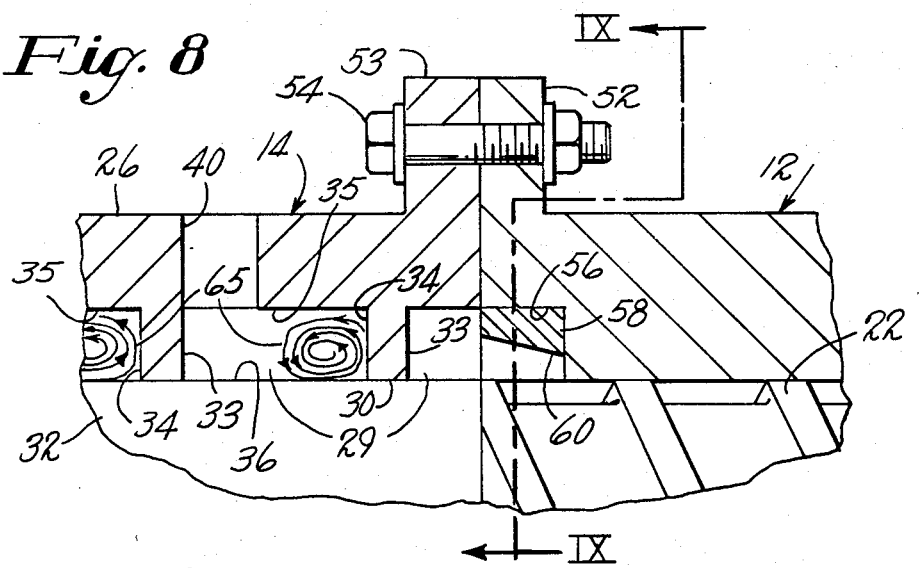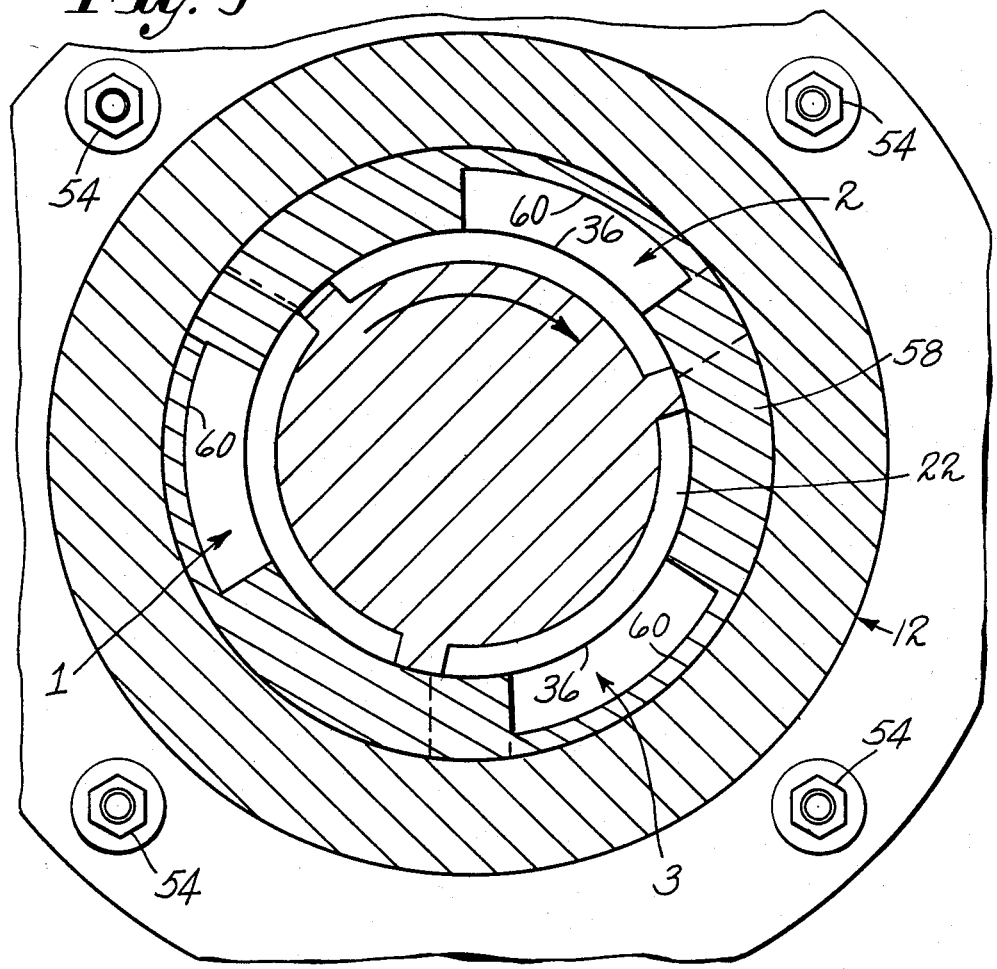

1

DEVOLATILIZING MIXING EXTRUDER

FIELD OF THE INVENTION

This invention relates to equipment for devolatilizing and mixing polymers in processing equipment such as for plasticating and extruding.

DESCRIPTION OF THE PRIOR ART

There is shown in U.S. Pat. No. 3,023,456 a typical extruding machine which is also adapted to remove unwanted volatile material generated during the plastication of typical polymers and similar materials. In the patent, vents in a screw barrel are arranged at portions of the plasticating screw having reduced pressure so that volatiles are free to pass out or be drawn from the vents. In such machines, the screws for transporting the material have portions of varying root diameter alternately to create reduced pressure for devolatilizing and to pressurize the material for feeding and/or extrusion. It is known also to vary the pitch of the screw threads for the same purpose. Obviously, such devolatilizing screws are costly to manufacture due to their complexity. Since the pressure of the polymer is continuously varied the forces and energy costs involved are high.

Other devolatilizing equipment are known in which the fluid material is heated to "boil-off" the volatiles, and to agitate the material to present new surfaces to encourage devolatilizing the material is also cascaded in a chamber of reduced pressure. However, such equipment is also costly and energy intensive. Accordingly, it is a general object of the invention to provide devolatilizing equipment which is simple in construction and is less energy intensive and is less costly to operate.

According to one feature of the invention a barrel has a bore in which helical channels extend from one end of a devolatilizing section to the other. The bore also receives a cylindrical rotor coaxially related to a feed section and output section. The arrangement is such that the feed efficiency of the devolatilizing section is substantially greater than the feed section and greatly reduces energy requirements since usually only two and no more than three surfaces of the unit engage the material rather than the usual four.

According to another feature, the material is fed by the surface of a rotor along one flank of the fixed helical channel in a rolling bank which occupies only half or less of the width of the channel. Helical vents extend through the barrel into the channel adjacent the other flank of the channel which is free of the material.

According to a further feature barriers are placed in the channels to spread the material across the channel to seal successive portions of the channel. Clearance cuts in the lands of the bore between adjacent channels at the up stream side of the barrier direct at least part of the material into preceding or succeeding channels for additional mixing of the materials and any additives such as fillers or fibers.

SUMMARY OF THE INVENTION

The present invention provides a novel devolatilizing apparatus which includes a barrrel having a bore in which helical channels are formed and in which a cylindrical rotor rotates. A feed section feeds fluid polymer material onto the rotor surface in streams divided according to the multiplicity of the channels. The vector of forces applied to the material by the rotor cause the material to form a rolling bank against the upstream flank of each channel with the bank flowing down stream along the flank. The rolling bank typically engages only two surfaces of the passage, i.e. one flank of the channel and the surface of the rotor. Helical slots pass through the barrel into the channel at the downstream flank not occupied by the rolling bank for drawing volatiles from the material.

DESCRIPTION OF THE DRAWINGS

FIG. 3 is a section on lines III—III of FIG. 1;

FIG. 4 is an oblique section through the devolatilizing section of the extruder and following a helical channel;

FIG. 5 is a schematic flattened view generated by unwrapping part of the barrel shown in FIG. 4;

FIG. 6 is a view similar to FIG. 4 showing an alternate form of the invention;

FIG. 7 is a section on lines VII—VII of FIG. 6;

FIG. 8 is a section showing a portion of the apparatus seen in FIG. 1 in enlarged scale;

FIG. 9 is a view substantially on lines IX—IX of FIG. 8 but extending through the entire barrel.

DESCRIPTION OF THE PREFERRED EMBODIMENT

Figure 1:
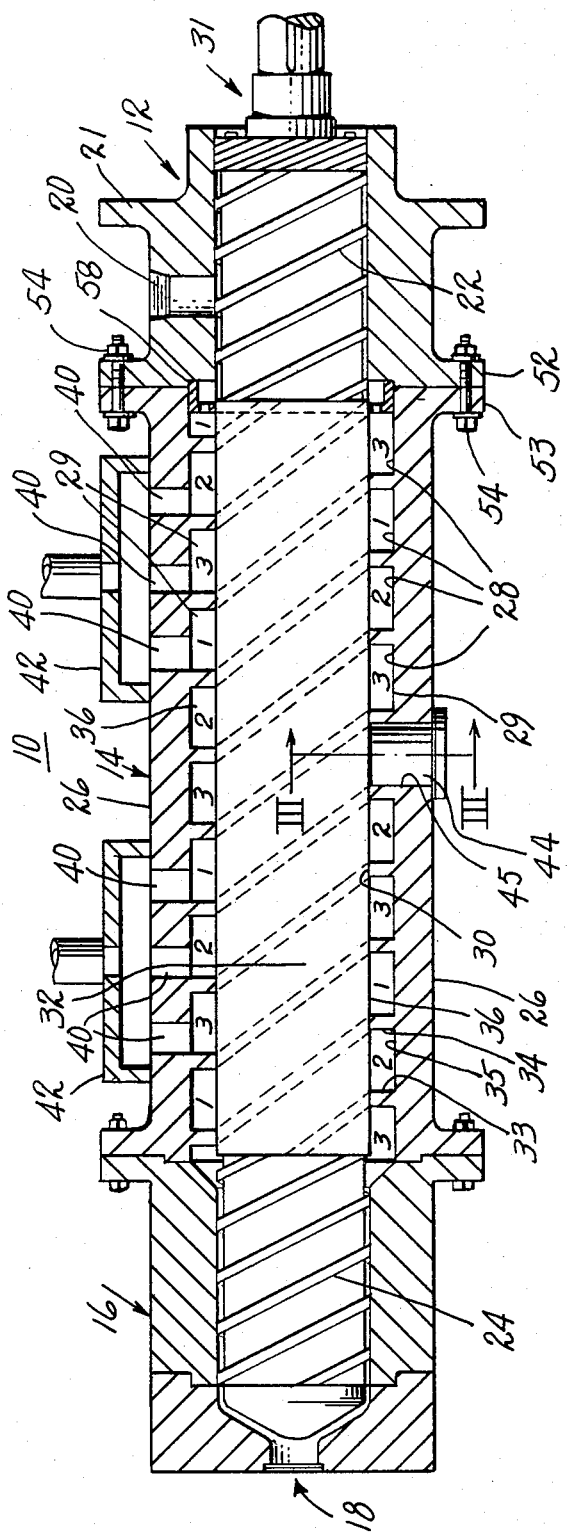
FIG. 1 is a longitudinal schematic section through an elementary extruder in which the invention is embodied.

A typical machine in which the invention may be embodied comprises an extruder 10 shown in elemental form in FIG. 1. As shown, the extruder has a feed section 12, a devolatilizing section 14, and a pressurizing section 16 which leads to an outlet 18.

The feed section 12 may be adapted to receive solid pellets of polymer to be processed through an inlet 20 in a barrel 21 which is heated to the extent necessary for melting and plasticating by a feed screw 22, or the inlet may receive previously melted or otherwise liquified polymers which are to be fed by the screw 22. A gear pump or other suitable polymer processing mechanism (not shown) could be substituted for the feed section 12 without departing from the scope of the invention defined by the appended claims. The general function of the feed section required to illustrate the invention is to supply fluid material to the upstream end of the devolatilizing section 14. Likewise, the pressurizing/extruding section 16 shown as having a screw 24 may take other forms so long as the polymer, having passed through the devolatilizing section 14 is transported therefrom and/or pressurized for subsequent processing such as extrusion through the outlet 18.

The devolatilizing section 14 comprises a barrel 26 having one or a multiple of helical channels 28 formed in a bore 30 of the barrel and extending from one end of the barrel to the other. The channels 28 are shown in FIG. 1 as triple flighted but other multiples or even single flights could be used without departing from the invention. A rotor 31 on which the screws 22 and 24 are carried is driven by a source of rotary power (not shown) but which may be of any suitable type of rotary motor such as hydraulic or electrical motors. The rotor also has a cylindrical section 32 which rotates in the bore with a running but substantially close fit therewith.

The surface 36 of the section 32 closes the inward open sides of the channels 28 to form helical passages 29 bounded by the side flanks 33, 34 and the root 35 of the channels and by the surface 36 of the rotor section 32.

Figure 2:
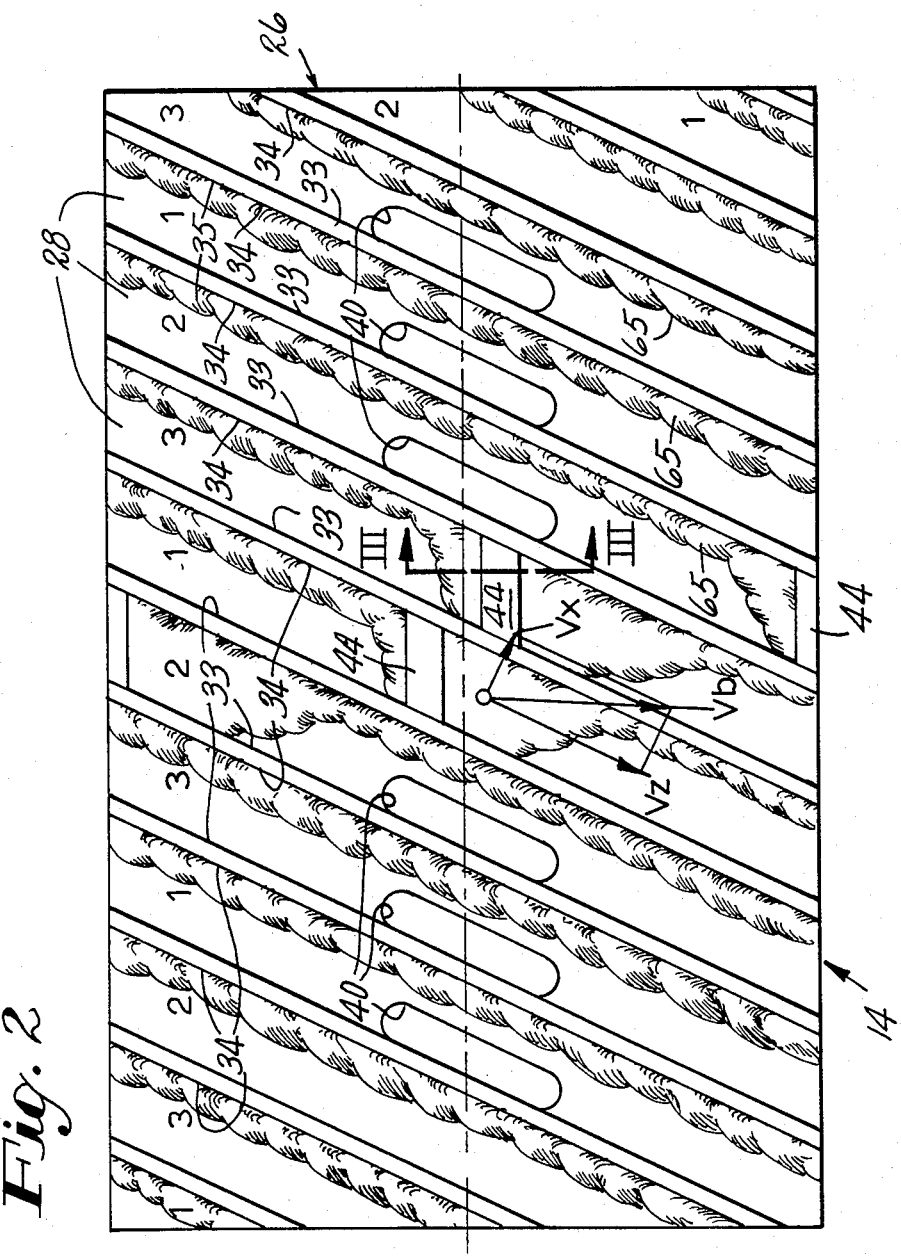
FIG. 2 is a schematic flattened view generated by unwrapping the extruder barrel from a rotor.

To explain the operation of the devolatilizing section 14, the barrel 26 is shown in FIG. 2 as unwrapped from the rotor 32 exposing the channels 28. The molten or otherwise fluid polymer is fed by the screw 22 to the channels 1, 2 and 3 in substantially equal amounts as shown in FIG. 2. The feeding capability of the devolatilizing section has proven to have such efficiency that the polymer is taken away from the feed section with the channels typically half full or less. The velocity of the surface 36 of the rotor section 32 as it is rotated in the bore 30 of the barrel is shown schematically in FIG. 2 as a vector Vb. Due to the helical disposition of the channels this results in a cross channel velocity of Vx and a downstream velocity vector of Vz. The net affect of these forces on the polymer entering the channels typically forms a rolling bank 65 (see also FIG. 8) of material engaging only the flanks 34 of the channels and the surface 36 of the rotor. Obviously, the force applied by vector Vx holds the rolling banks against the flanks 34 while the force vector Vz moves the banks along the flanks 34 toward the discharge ends of the passages at the section 16 of the extruder.

It should be noted that in a screw devolatilizer the liquid polymer always contacts at least three walls even when operated in a "starved condition" with partially full flight channels. This is due to the fact that the material is constantly scraped from the fixed barrel bore and runs down the flanks of the screw channels and across the roots of the channels. However, with the apparatus of the invention the material is carried by the surface of the moving rotor and engaged by the fixed flank of the helical channel so as to move downstream along the flank in a rolling bank 65 which engages only the moving surface 36 of the rotor and the flank 34 of the fixed helical channel. Thus, the resistance to flow acting on the polymer is considerably less where the material engages only two surfaces rather than for three or four surface contact in a moving screw channel. This has been proven experimentally by placing a transparent member over the open side of a plurality of channels. A medium viscosity mixture of silicon oil was fed into the channels and the two surface contact described above was observed.

At appropriate locations, the upper side of the barrel is provided with helical openings 40 which extend through the barrel into each channel adjacent the flanks 33. As most graphically seen in FIG. 2, the width of the openings 40 is one half or less of the width of each channel so that the rolling banks 65 of polymer do not engage the openings, although volatiles generated during processing of the polymer are free to escape through the openings. Suitable manifolds (FIG. 1) may extend across several openings to provide a desired vacuum level for adjacent channels or each opening may be individually connected to such a vacuum by means not shown. Since the polymer banks are constantly rotating, the material is constantly agitated exposing fresh surfaces from which the volatiles may be drawn. With the arrangement shown, it is possible to apply different vacuum levels progressively to the polymer banks. To this end, each channel is provided with at least one barrier 44 (FIGS. 2 and 3) which extends through openings 45 in the barrel and may be adjusted radially to vary a clearance 46 between the inner end of the barrier and the surface 36 of the rotor. The adjustment may be accomplished by changing shims 48 (FIG. 3) or by other suitable threaded adjustments (not shown). The clearance 46 extends across the channel and is adapted to accommodate passage of the polymer in the channel without a significant build-up of pressure on the material. In this way a seal is provided by the material filling the clearance to isolate successive parts of the channel without significantly impeding progress of polymer along the channel or causing undesirable build-up of polymer near the openings 40.

Depending on the viscosity of the polymer being processed it will be possible with some materials, to eliminate the barriers 44. With lower viscosity materials, the material will tend to sag and build-up and fill the passage at the underside of the rotor. This is shown graphically in FIGS. 4 and 5 where the rolling bank 65 is shown at the upper side of the rotor 32 in its reduced size, adjacent the opening 40. As the bank passes the horizontal at about point A, the material starts to spread across the passage until it fills the entire passage at point B and acts to seal the passage. At about point C the material tends to shrink back against the flank 34 and assume its original form at about point D. The simple explanation of this action is that for the material to climb uphill from the lowest point in the passage, the gravimetric force on the material has to be overcome by sufficient pressure on the material. A partly filled channel (of a screw) is not capable of generating pressure. At this point the fixed helical channels act in a manner similar to a moving screw channel. It is also possible to enhance the channel filling action for sealing purposes without barriers by inserting a suitably contoured profile member 50 in the channel as seen in FIGS. 6 and 7.

Referring to FIGS. 8 and 9, there is shown a means for controlling the transfer of material from the feed section 12 into the devolatilizing section 14 so as to equalize the amounts of material fed to each channel. As shown, the feed section 12 is provided with a flange 52 secured to a mating flange 53 of the barrel 26 by bolts 54. As best seen in FIG. 8, the flange 52 is provided with an annular recess 56 which receives a ring 58 having three equally spaced slots 60 which lead from the end of feed screw 22 to the upstream ends of the passages 29. By appropriate rotational adjustment of the rings 58 (see also FIG. 9), the effective length of the slots 60 can be varied at least to the extent of the thickness of the land between adjacent passages. By the throttling action of the slots equal streams of polymer can be directed into each of the passages 29 onto the rotating surface 36 of the rotor 32. As above described, the polymer in each passage forms a rolling bank 65 which usually engages only the flank 34 and the surface 36 of the rotor.

Figure 10:
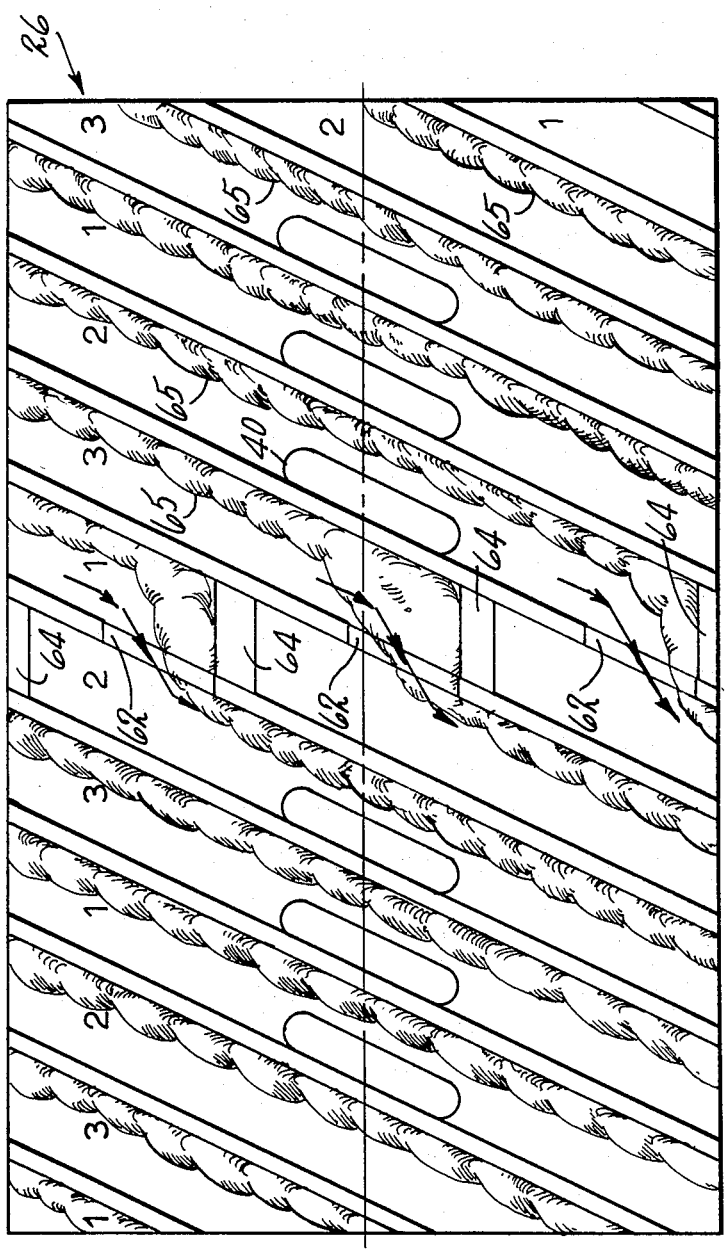
FIGS. 10, 11 and 12 are views similar to FIG. 2 showing alternate forms of the invention.
Figure 11:
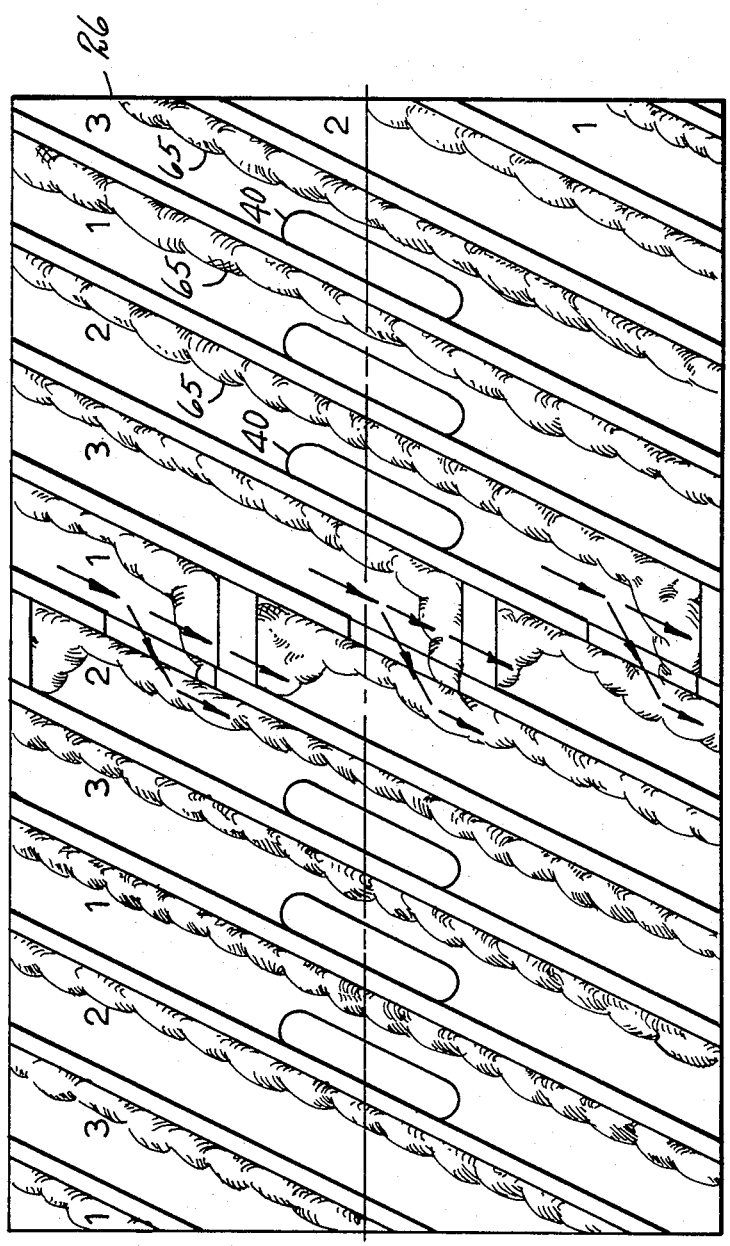
Figure 12:
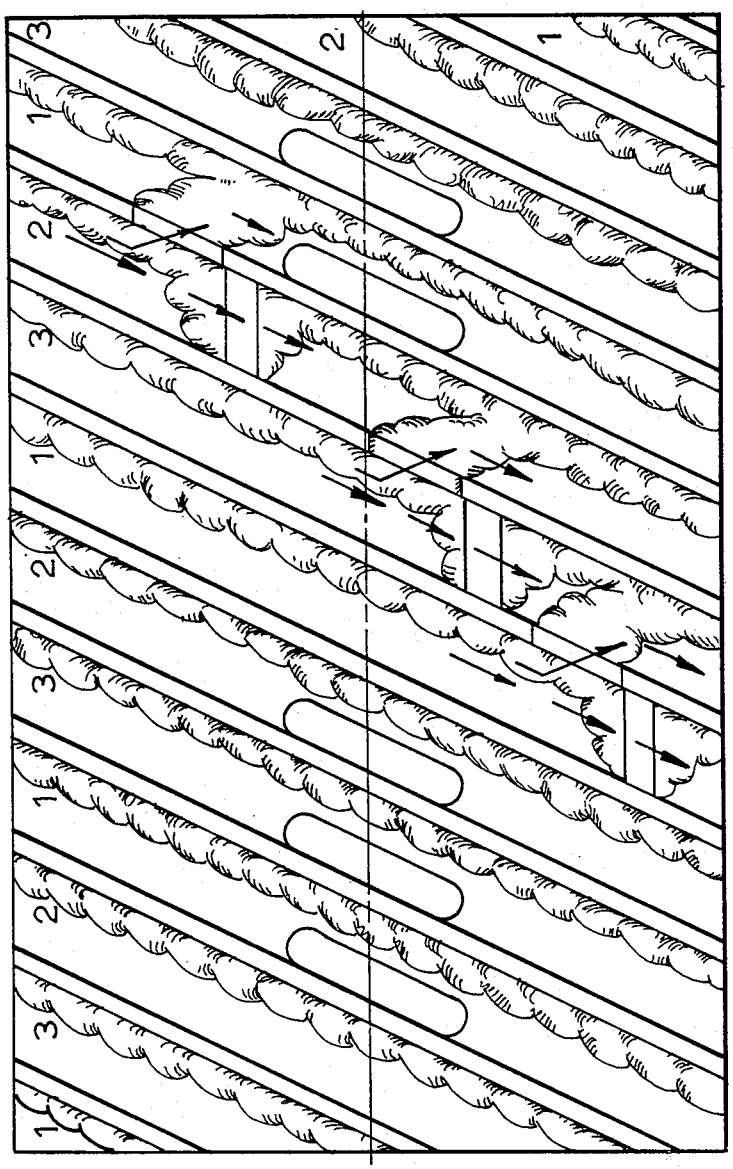

For mixing the material being devolatilized in the section 14, the lands of the bore 30 between adjacent channels are provided with clearance cuts 62 extending upstream from barriers 64 as seen in FIG. 10. If little or no clearance is provided between the inner end of the barrier and the surface 36 of the rotor, the material in the channel will be forced into the next adjacent downstream channel. If, however, such barrier clearance is provided, part of the material will continue along the channel and part will pass into the downstream channel as seen in FIG. 11. Referring to FIG. 12 another alternative arrangement is shown in which the upstream land is provided with a clearance cut so that the material is caused to flow back into the upstream channel for additional mixing and/or devolatilizing. By provision of means to introduce additives such as other liquids or solids such as fillers and fibers (e.g. glass fibers, sisal Kevlar, nylon or polyester fibers), the stream splitting and back mixing capabilities described above can cause the mixing of materials introduced with the devolatilized polymer.

While preferred embodiments have been described it should be apparent that a variety of elements could be substituted for those described without departing from the scope of the invention defined by the appended claims.

We claim:

1. Devolatilizing apparatus comprising a barrel housing having an axial bore in the surface of which is formed at least one helical channel, a cylindrical rotor coaxially mounted in the bore and closing the open side of the channel to form a helical passage, means for directing fluid plastic into one end of the passage in an amount less than the volumetric capacity of the passage, means for rotating the rotor to move the limited volume of the plastic against and along one side of the passage in the form of a rolling bank, a port extending through the housing and into an unoccupied part of the passage adjacent the rolling bank for withdrawing volatiles.

2. Apparatus according to claim 1 in which the directing means includes at least one or more openings entering the one or more passages adjacent the upstream side.

3. Apparatus according to claim 2 in which the directing means is rotatably adjustable to vary the effective size of the opening or openings to vary the amount of plastic admitted to the passage.

4. Apparatus according to claim 2 in which the speed of the rotor and the fluid plastic directing means are coordinated so that each passage is only partly filled thereby causing the fluid plastic to be rolled along one flank of the channel contacting only that flank and the rotor surfaces.

5. Apparatus according to claim 1 in which multi-flighted channels are formed in the surface of the bore and the cylindrical rotor closes the open sides of the channels to form adjacent multi-flighted helical passages and in which the directing means has a number of openings equal to the number of passages.

6. Apparatus according to claim 5 in which the directing means is rotatably adjustable to vary the effective sizes of the openings to vary the amount of plastic admitted to each passage.

7. Apparatus according to claim 1 in which the channel is provided with at least one barrier at least partially closing the passage to spread the plastic across the width of the passage for sealing the passage.

8. Apparatus according to claim 7 in which a land in the bore between adjacent turns of the passage is provided with a clearance adjacent the barrier at the downstream side of the passage for directing at least part of the plastic in the passage into the next adjacent downstream turn of the passage.

9. Apparatus according to claim 7 in which a land in the bore between adjacent turns of the passage is provided with a clearance adjacent the barrier at the upstream side of the passage for directing at least part of the plastic in the passage into the next adjacent upstream turn of the passage.

10. Apparatus according to claims 7 or 8 or 9 in which the clearance between the end of the barrier and the rotor surface is variable.

11. Apparatus according to claim 1 in which multi-flighted channels are formed in the surface of the bore and the cylindrical rotor closes the open sides of the channels to form adjacent multi-flighted helical passages and in which each channel is provided with at least one barrier at least partially closing each passage to spread plastic across the width of the passage for sealing the passage and in which the land between adjacent channels are each provided with a clearance adjacent the barrier at the downstream side of the passage for directing at least part of the plastic in each passage into the adjacent downstream passage.

12. Apparatus according to claim 1 in which multi-flighted channels are formed in the surace of the bore and the cylindrical rotor closes the open sides of the channels to form adjacent multi-flighted helical passages and in which each channel is provided with at least one barrier at least partially closing each passage to spread plastic across the width of the passage for sealing the passage in which the lands between adjacent channels are each provided with clearances adjacent the barrier at the upstream side of each passage for directing at least part of the plastic in each passage into the adjacent upstream passage.

13. Apparatus according to claims 11 or 12 in which the clearances between the ends of the barriers and the rotor surface are variable.

14. Apparatus according to claim 1 in which a contoured member is received, extends across and along a portion of a single turn of a channel reducing the size of the channel to cause the plastic in the passage to be spread so as to fill the passage.

* * * * *